(12) United States Patent
Khaled et al.

(10) Patent No.: US 11,243,016 B2
(45) Date of Patent: Feb. 8, 2022

(54) REFRIGERATION SYSTEM WITH COMBINED SUPERHEAT AND SUBCOOLING CONTROL

(71) Applicant: Hill Phoenix, Inc., Conyers, GA (US)

(72) Inventors: Nassim Khaled, Decatur, GA (US); Michael Hill, Conyers, GA (US)

(73) Assignee: Hill Phoenix, Inc., Conyers, GA (US)

( * ) Notice: Subject to any disclaimer, the term of this patent is extended or adjusted under 35 U.S.C. 154(b) by 191 days.

(21) Appl. No.: 16/126,275

(22) Filed: Sep. 10, 2018

(65) Prior Publication Data

US 2019/0078818 A1    Mar. 14, 2019

Related U.S. Application Data

(60) Provisional application No. 62/557,478, filed on Sep. 12, 2017.

(51) Int. Cl.
*F25B 40/02* (2006.01)
*F25B 49/02* (2006.01)
(Continued)

(52) U.S. Cl.
CPC .............. *F25B 40/02* (2013.01); *F25B 41/20* (2021.01); *F25B 41/31* (2021.01); *F25B 49/02* (2013.01);
(Continued)

(58) Field of Classification Search
CPC .... F25B 40/02; F25B 41/062; F25B 2700/21; F25B 41/04; F25B 40/022; F25B 41/20;
(Continued)

(56) References Cited

U.S. PATENT DOCUMENTS

2011/0083456 A1 *  4/2011  Wakamoto ............. F25B 41/00
                                                              62/115

FOREIGN PATENT DOCUMENTS

WO    WO-2014199788 A1 * 12/2014  ............. F25B 13/00

OTHER PUBLICATIONS

Junichi, Air-conditioning device, 2014, Full Document (Year: 2014).*

* cited by examiner

*Primary Examiner* — Elizabeth J Martin
*Assistant Examiner* — Nael N Babaa
(74) *Attorney, Agent, or Firm* — Fish & Richardson P.C.

(57) ABSTRACT

A refrigeration system includes a subcooler configured to provide subcooling for a liquid refrigerant flowing through a first side of the subcooler by transferring heat from the liquid refrigerant to a gas refrigerant flowing through a second side of the subcooler. An expansion valve is located at an inlet of the second side of the subcooler and configured to control a flow of the gas refrigerant through the second side of the subcooler. A gas temperature sensor and a gas pressure sensor are configured to measure a temperature and pressure of the gas refrigerant. A liquid temperature sensor is configured to measure a temperature of the subcooled liquid refrigerant. A controller is configured to calculate a superheat of the gas refrigerant based on the measured temperature and measured pressure of the gas refrigerant and may compare the calculated superheat to a superheat threshold. If the calculated superheat is less than the superheat threshold, the controller may close the expansion valve. If the calculated superheat is equal to or greater than the superheat threshold, the controller may operate the expansion valve using a feedback control technique to drive the temperature of the subcooled liquid refrigerant to a subcooled liquid temperature setpoint.

20 Claims, 4 Drawing Sheets

(51) Int. Cl.
*F25B 41/20* (2021.01)
*F25B 41/31* (2021.01)
*F25B 5/02* (2006.01)
*F25B 6/02* (2006.01)

(52) U.S. Cl.
CPC .............. *F25B 49/022* (2013.01); *F25B 5/02* (2013.01); *F25B 6/02* (2013.01); *F25B 2400/0403* (2013.01); *F25B 2400/075* (2013.01); *F25B 2500/19* (2013.01); *F25B 2600/0271* (2013.01); *F25B 2600/21* (2013.01); *F25B 2600/2501* (2013.01); *F25B 2600/2503* (2013.01); *F25B 2600/2509* (2013.01); *F25B 2600/2513* (2013.01); *F25B 2700/191* (2013.01); *F25B 2700/195* (2013.01); *F25B 2700/1931* (2013.01); *F25B 2700/1933* (2013.01); *F25B 2700/2106* (2013.01); *F25B 2700/2108* (2013.01); *F25B 2700/21151* (2013.01); *F25B 2700/21152* (2013.01); *F25B 2700/21163* (2013.01)

(58) Field of Classification Search
CPC F25B 5/02; F25B 2600/21; F25B 2600/2509; F25B 2600/2513
See application file for complete search history.

REFRIGERATION SYSTEM WITH COMBINED SUPERHEAT AND SUBCOOLING CONTROL

CROSS-REFERENCE TO RELATED APPLICATIONS

This application claims the benefit of priority to U.S. Provisional Application No. 62/557,478, filed on Sep. 12, 2017, which is incorporated herein by reference in its entirety.

BACKGROUND

The present disclosure relates generally to a refrigeration system and more particularly to a refrigeration system with a subcooler configured to subcool a liquid refrigerant.

Some refrigeration systems include a subcooler configured to subcool a liquid refrigerant. The subcooled liquid refrigerant can be expanded and provided to one or more evaporators of the refrigeration system. The subcooler may transfer heat from the liquid refrigerant to a gas refrigerant. Conventional subcoolers include an expansion valve configured to control the flow of the gas refrigerant through the subcooler and a separate pressure regulator valve configured to control the superheat of the gas refrigerant exiting the subcooler. It would be desirable to simplify the operation of the refrigeration system while maintaining the ability to provide both superheat control and subcooling control.

SUMMARY

A refrigeration system includes a subcooler configured to provide subcooling for a liquid refrigerant flowing through a first side of the subcooler by transferring heat from the liquid refrigerant to a gas refrigerant flowing through a second side of the subcooler. An expansion valve is located at an inlet of the second side of the subcooler and configured to control a flow of the gas refrigerant through the second side of the subcooler. A gas temperature sensor and a gas pressure sensor are configured to measure a temperature and pressure of the gas refrigerant. A liquid temperature sensor is configured to measure a temperature of the subcooled liquid refrigerant. A controller is configured to calculate a superheat of the gas refrigerant based on the measured temperature and measured pressure of the gas refrigerant and may compare the calculated superheat to a superheat threshold. If the calculated superheat is less than the superheat threshold, the controller may close the expansion valve. However, if the calculated superheat is equal to or greater than the superheat threshold, the controller may operate the expansion valve using a feedback control technique to drive the temperature of the subcooled liquid refrigerant to a subcooled liquid temperature setpoint.

In some embodiments, the refrigeration system includes a fluid conduit coupled to an outlet of the second side of the subcooler and configured to receive the gas refrigerant exiting the subcooler. The gas temperature sensor and the gas pressure sensor may be located along the fluid conduit and configured to measure the temperature and pressure of the gas refrigerant within the fluid conduit.

In some embodiments, the refrigeration system includes a liquid refrigerant line coupled to an inlet of the first side of the subcooler and configured to deliver a first portion of the liquid refrigerant to the first side of the subcooler. In some embodiments, the refrigeration system includes a connecting line coupled to the liquid refrigerant line and to the expansion valve and configured to deliver a second portion of the liquid refrigerant to the expansion valve.

In some embodiments, the controller includes a valve controller configured to operate the expansion valve, a feedback controller configured to generate a valve position signal using the feedback control technique and provide the valve position signal to the valve controller, and a comparator configured to compare the calculated superheat to a superheat threshold and provide a valve close signal the valve controller in response to a determination that the calculated superheat is less than the superheat threshold.

In some embodiments, the valve controller is configured to operate the expansion valve using the valve position signal when the close signal is not provided by the comparator and override the valve position signal with the close signal when the close signal is provided by the comparator, the close signal causing the expansion valve to close.

In some embodiments, the feedback controller is configured to generate the valve position signal based on a difference between the temperature of the subcooled liquid refrigerant and the subcooled liquid temperature setpoint.

In some embodiments, closing the expansion valve includes completely closing the expansion valve to completely stop a flow of the gas refrigerant through the subcooler or partially closing the expansion valve to reduce the flow of the gas refrigerant through the subcooler.

Another implementation of the present disclosure is controller for a refrigeration system. The controller includes a processing circuit having one or more processors and memory. The processing circuit is configured to calculate a superheat of a gas refrigerant exiting a second side of a subcooler based on a measured temperature and a measured pressure of the gas refrigerant and compare the calculated superheat to a superheat threshold. In response to a determination that the calculated superheat is less than the superheat threshold, the processing circuit may close an expansion valve located at an inlet of the second side of the subcooler and to restrict a flow of the gas refrigerant through the second side of the subcooler. In response to a determination that the calculated superheat is equal to or greater than the superheat threshold, the processing circuit may operate the expansion valve using a feedback control technique to drive a temperature of a subcooled liquid refrigerant exiting a first side of the subcooler to a subcooled liquid temperature setpoint.

In some embodiments, the temperature and pressure of the gas refrigerant are measured by a gas temperature sensor and a gas pressure sensor located along a fluid conduit coupled to an outlet of the second side of the subcooler and configured to receive the gas refrigerant exiting the subcooler.

In some embodiments, the processing circuit includes a valve controller configured to operate the expansion valve, a feedback controller configured to generate a valve position signal using the feedback control technique and provide the valve position signal to the valve controller, and a comparator configured to compare the calculated superheat to a superheat threshold and provide a valve close signal the valve controller in response to a determination that the calculated superheat is less than the superheat threshold.

In some embodiments, the valve controller is configured to operate the expansion valve using the valve position signal when the close signal is not provided by the comparator and override the valve position signal with the close signal when the close signal is provided by the comparator, the close signal causing the expansion valve to close.

In some embodiments, the feedback controller is configured to generate the valve position signal based on a difference between the temperature of the subcooled liquid refrigerant and the subcooled liquid temperature setpoint.

In some embodiments, closing the expansion valve includes completely closing the expansion valve to completely stop a flow of the gas refrigerant through the subcooler or partially closing the expansion valve to reduce the flow of the gas refrigerant through the subcooler.

Another implementation of the present disclosure is a method for controlling a refrigeration system. The method includes operating a subcooler to provide subcooling for a liquid refrigerant flowing through a first side of the subcooler by transferring heat from the liquid refrigerant to a gas refrigerant flowing through a second side of the subcooler, operating an expansion valve located at an inlet of the second side of the subcooler to control a flow of the gas refrigerant through the second side of the subcooler, measuring a temperature and pressure of the gas refrigerant using a gas temperature sensor and a gas pressure sensor, measuring a temperature of the subcooled liquid refrigerant using a liquid temperature sensor, calculating a superheat of the gas refrigerant based on the measured temperature and measured pressure of the gas refrigerant, and comparing the calculated superheat to a superheat threshold. In response to a determination that the calculated superheat is less than the superheat threshold, the method includes closing the expansion valve. In response to a determination that the calculated superheat is equal to or greater than the superheat threshold, the method includes operating the expansion valve using a feedback control technique to drive the temperature of the subcooled liquid refrigerant to a subcooled liquid temperature setpoint.

In some embodiments, the method includes receiving the gas refrigerant exiting the subcooler within a fluid conduit coupled to an outlet of the second side of the subcooler. The gas temperature sensor and the gas pressure sensor may be located along the fluid conduit and measure the temperature and pressure of the gas refrigerant within the fluid conduit.

In some embodiments, the method includes delivering a first portion of the liquid refrigerant to the first side of the subcooler via a liquid refrigerant line coupled to an inlet of the first side of the subcooler and delivering a second portion of the liquid refrigerant to the expansion valve via a connecting line coupled to the liquid refrigerant line and to the expansion valve.

In some embodiments, the expansion valve is operated by a valve controller. The method may further include generating a valve position signal using the feedback control technique and providing the valve position signal to the valve controller and providing a valve close signal the valve controller in response to a determination that the calculated superheat is less than the superheat threshold.

In some embodiments, operating the expansion valve includes operating the expansion valve using the valve position signal when the close signal is not provided and overriding the valve position signal with the close signal when the close signal is provided, the close signal causing the expansion valve to close.

In some embodiments, the valve position signal is generated based on a difference between the temperature of the subcooled liquid refrigerant and the subcooled liquid temperature setpoint.

In some embodiments, closing the expansion valve includes completely closing the expansion valve to completely stop a flow of the gas refrigerant through the subcooler or partially closing the expansion valve to reduce the flow of the gas refrigerant through the subcooler.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a refrigeration system with combined superheat and subcooling control and components thereof are shown, according to various exemplary embodiments. The refrigeration system may include a subcooler configured to provide subcooling for a liquid refrigerant delivered to one or more evaporators. The subcooler may include a first side through which a liquid refrigerant flows and a second side through which a refrigerant gas flows. The refrigerant gas may absorb heat from the liquid refrigerant in the subcooler to provide subcooling for the liquid refrigerant.

Advantageously, a single electronic expansion valve (EEV) can be operated to control both the superheat of the gas refrigerant exiting the second side of the subcooler and the subcooled liquid refrigerant exiting the first side of the subcooler. In some embodiments, a temperature sensor and a pressure sensor are positioned to measure the temperature and pressure of the refrigerant gas at the outlet of the second side of the subcooler and/or within the second side of the subcooler. A controller can use the temperature and pressure measurements to calculate the superheat of the refrigerant gas. The controller may compare the calculated superheat to a superheat threshold.

If the calculated superheat is less than the superheat threshold, the controller may close the EEV (completely or partially) to stop or restrict the flow of the gas refrigerant through the subcooler. However, if the calculated superheat is equal to or greater than the superheat threshold, the controller may use a feedback control technique to control the position of the EEV. For example, the controller may receive a measurement of the temperature of the subcooled liquid refrigerant at the outlet of the first side of the subcooler and may calculate an error between the measured temperature of the subcooled liquid and a subcooled liquid temperature setpoint. The controller may adjust the position of the EEV to drive the error to zero. These and other features of the refrigeration system are described in greater detail below.

Refrigeration System With Independent Superheat and Subcooling Control

Figure 1:
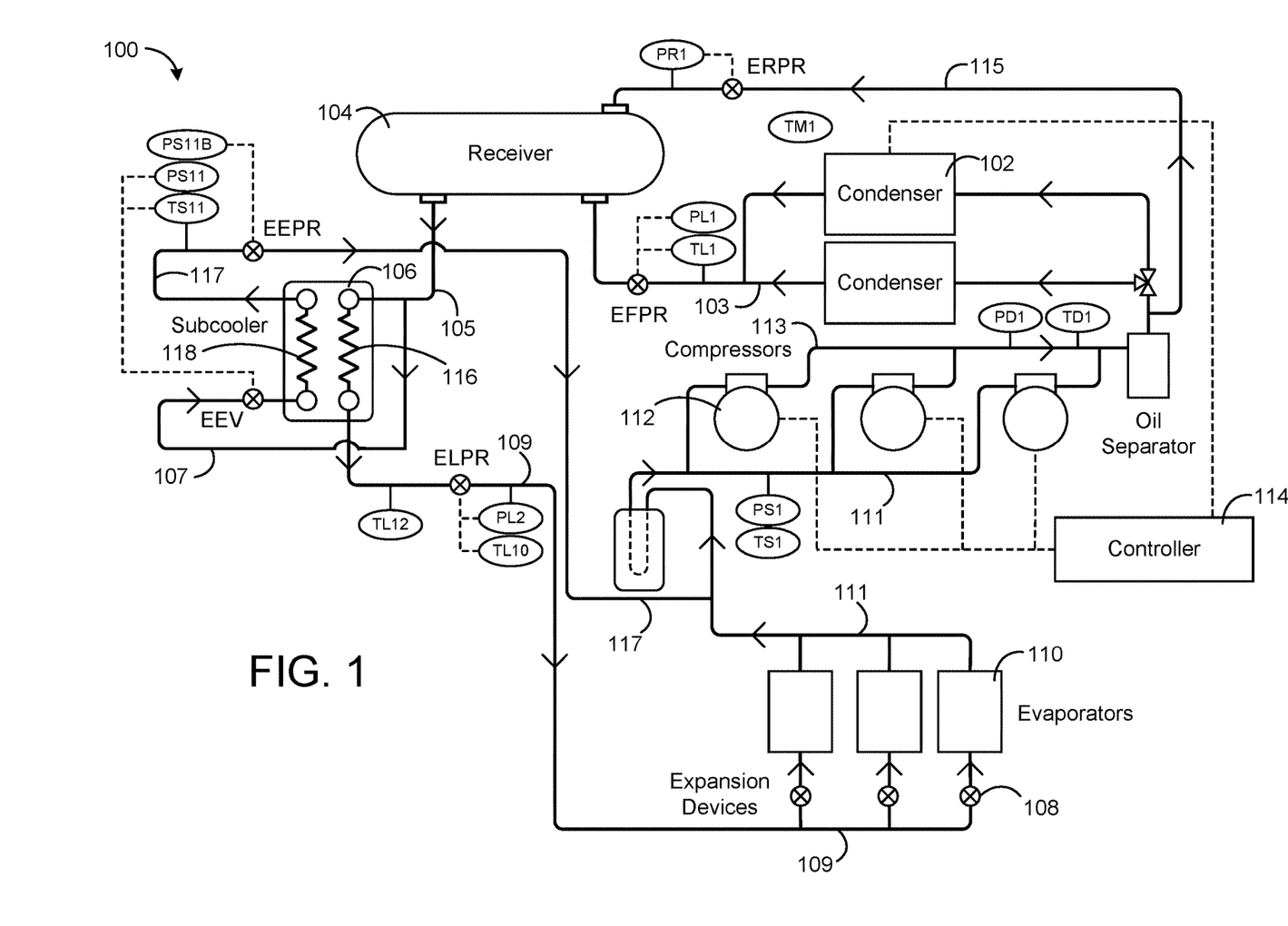
FIG. 1 is diagram of a refrigeration system with independent superheat and subcooling control, according to an exemplary embodiment.

Referring now to FIG. 1, a refrigeration system 100 is shown, according to an exemplary embodiment. Refrigeration system 100 may be used in conjunction with a temperature-controlled display device (e.g., a refrigerated merchandiser) or other refrigeration device used to store and/or display refrigerated or frozen objects in a commercial, institutional, or residential setting. Refrigeration system 100 is shown to include condensers 102, a receiver 104, a subcooler 106, expansion devices 108, evaporators 110, compressors 112, a controller 114, and a variety of sensors and control valves. In some embodiments, refrigeration system 100 operates using a vapor-compression refrigeration cycle in which a refrigerant is circulated between condensers 102 and evaporators 110 to provide cooling for evaporators 110.

Condensers 102 may be heat exchangers or other similar devices for removing heat from a refrigerant that circulates between evaporators 110 and condensers 102. In some embodiments, condensers 102 include multiple condensers arranged in parallel with each other. Condensers 102 may receive vapor refrigerant from compressors 112 and may partially or fully condense the vapor refrigerant by removing heat from the refrigerant. The condensation process may result in a liquid refrigerant or a liquid-vapor mixture. In other embodiments, condensers 102 cool the refrigerant vapor (e.g., by removing superheat) without condensing the refrigerant vapor. In some embodiments, the cooling/condensation process is an isobaric process. Condensers 102 may provide the cooled and/or condensed refrigerant to receiver 104 via fluid conduit 103.

Receiver 104 may collect liquid refrigerant from fluid conduit 103 and may receive gas refrigerant via fluid conduit 115. In some embodiments, receiver 104 is a flash tank or other fluid reservoir. Receiver 104 may include a liquid portion and a vapor portion and may contain a partially saturated mixture of liquid refrigerant and vapor refrigerant. In some embodiments, receiver 104 separates the liquid refrigerant from the vapor refrigerant. The liquid refrigerant may exit receiver 104 through fluid conduit 105, which may deliver the liquid refrigerant to a first side 116 of subcooler 106.

Subcooler 106 can be configured to subcool the liquid refrigerant provided by receiver 104. Subcooler 106 is shown to include a first side 116 and a second side 118. First side 116 may receive the liquid refrigerant from fluid conduit 105. In some embodiments, a connecting line 107 fluidly connects fluid conduit 105 to a second side 118 of subcooler 106. An electronic expansion valve (EEV) may be disposed along connecting line 107 and may be configured to expand the liquid refrigerant to a low temperature gas. The gas refrigerant may flow through second side 118 of subcooler 106 and may absorb heat from the liquid refrigerant in first side 116, thereby providing subcooling for the liquid refrigerant. The subcooled refrigerant exiting first side 116 may be delivered to expansion devices 108 via a fluid conduit 109, whereas the gas refrigerant exiting second side 118 may be delivered to fluid conduit 111 (downstream of evaporators 110) via a fluid conduit 117.

Expansion devices 108 may be electronic expansion valves or another similar expansion devices. In various embodiments, expansion devices 108 may be controlled by controller 114 (e.g., using an automatic control scheme), manually by a user, or may be set to a predetermined position. In some embodiments, expansion devices 108 include multiple expansion devices arranged in parallel with each other. Expansion devices 108 may cause the subcooled refrigerant to undergo a rapid drop in pressure, thereby expanding the subcooled refrigerant to a lower pressure, lower temperature state. The expanded refrigerant is then provided to evaporators 110.

Evaporators 110 may receive the cooled and expanded refrigerant from expansion devices 108. In some embodiments, evaporators 110 include multiple evaporators arranged in parallel with each other. In some embodiments, evaporators 110 are associated with display cases/devices (e.g., if refrigeration system 100 is implemented in a supermarket setting). Evaporators 110 may be configured to facilitate the transfer of heat from the display cases/devices into the refrigerant. The added heat may cause the refrigerant to evaporate partially or completely. In some embodiments, the evaporation process may be an isobaric process. Evaporators 110 may output the refrigerant into a suction line 111 which delivers the refrigerant to compressors 112.

Compressors 112 may compress the refrigerant to a high temperature, high pressure gas. In some embodiments, compressors 112 include multiple compressors arranged in parallel with each other. Compressors 112 can discharge the high temperature, high pressure refrigerant into a discharge line 113 which fluidly connects compressors 112 to condensers 102. In some embodiments, a fluid conduit 115 fluidly connects discharge line 113 to a gas inlet of receiver 104. Compressors 112 may be controlled by controller 114, or by any suitable controller and control scheme.

Refrigeration system 100 is shown to include a variety of sensors and control valves. For example, refrigeration system 100 may include a liquid pressure sensor PL1 and a liquid temperature sensor TL1 configured to measure the pressure and temperature of the liquid refrigerant in fluid conduit 103. In some embodiments, the measurements obtained by sensors PL1 and TL1 are provided as an input to controller 114. Controller 114 can use the measurements obtained by sensors PL1 and TL1 to control the position of the electronic pressure regulator valve EFPR positioned along fluid conduit 103. The EFPR valve can be operated by controller 114 to regulate the pressure of the refrigerant in receiver 104.

Refrigeration system 100 may include a receiver pressure sensor PR1 configured to measure the pressure of the refrigerant in fluid conduit 115 and/or within receiver 104. In some embodiments, the measurements obtained by pressure sensor PR1 are provided as an input to controller 114. Controller 114 can use the measurements obtained by pressure sensor PR1 to control the position of the electronic pressure regulator valve ERPR positioned along fluid conduit 115. The ERPR valve can be operated by controller 114 to regulate the pressure of the refrigerant gas in receiver 104.

Refrigeration system 100 may include an ambient temperature sensor TM1 configured to measure the ambient temperature outside condensers 102. In some embodiments, the measurements obtained by temperature sensor TM1 are provided as an input to controller 114. Controller 114 can use the measurements obtained by temperature sensor TM1 determine a temperature differential between the refrigerant in condensers 102 and the ambient temperature. This temperature differential may have an impact on the rate of heat transfer provided by condensers 102 and can be used by controller 114 to determine the operating efficiency of condensers 102.

Refrigeration system 100 may include a gas pressure sensor PS11 and a gas temperature sensor TS11 configured to measure the pressure and temperature of the gas refrigerant exiting second side 118 of subcooler 106 (i.e., the gas refrigerant in fluid conduit 117). Alternatively, sensors PS11 and TS11 can be positioned to measure the pressure and temperature of the refrigerant gas within second side 118 of subcooler 106. In some embodiments, the measurements obtained by sensors PS11 and TS11 are provided as an input to controller 114. Controller 114 can use the measurements obtained by sensors PS11 and TS11 to calculate an amount of superheat of the gas refrigerant in fluid conduit 117. In some embodiments, controller 114 uses the calculated amount of superheat to control the position of an electronic expansion valve (EEV) positioned along connecting line 107. Controller 114 can variably open and close the EEV to regulate the amount of superheat of the gas refrigerant within second side 118 of subcooler 106 and/or within fluid conduit 117. Controller 114 can set the position of the EEV to a fully open position, a fully closed position, or any intermediate position between the fully open and fully closed positions to adjust the amount of superheat. In other embodiments, the measurements obtained by sensors PS11 and TS11 are provided directly to the EEV and used by the EEV to calculate the amount of superheat of the gas refrigerant in fluid conduit 117. The EEV can use a feedback control technique (e.g., PID control) to open and close the EEV to control the amount of superheat.

In some embodiments, adjusting the EEV toward the fully closed position decreases the pressure of the refrigerant gas in subcooler 106, which increases the amount of superheat. Conversely, adjusting the EEV toward the fully open position may increase the pressure of the refrigerant gas within subcooler 106, which decreases the amount of superheat. Accordingly, controller 114 can variably close the EEV (i.e., move the EEV toward the fully closed position) to increase the amount of superheat in response to a determination that the calculated amount of superheat is less than a setpoint or target value. Similarly, controller 114 can variably open the EEV (i.e., move the EEV toward the fully open position) to decrease the amount of superheat in response to a determination that the calculated amount of superheat is greater than the setpoint or target value. In this way, controller 114 can control the EEV to achieve a setpoint or target value for the amount of superheat of the gas refrigerant exiting subcooler 106.

Refrigeration system 100 may include a gas pressure sensor PS11B configured to measure the pressure of the gas refrigerant exiting second side 118 of subcooler 106 (i.e., the gas refrigerant in fluid conduit 117). Alternatively, sensor PS11B can be positioned to measure the pressure of the refrigerant gas within second side 118 of subcooler 106. In some embodiments, the measurements obtained by sensor PS11B are provided as an input to controller 114. Controller 114 can use the measurements obtained by sensor PS11B to control the position of an electronic pressure regulator valve (EEPR) positioned along fluid conduit 117. Controller 114 can variably open and close the EEPR valve to regulate the pressure of the gas refrigerant within second side 118 of subcooler 106 and/or within fluid conduit 117. Controller 114 can set the position of the EEPR valve to a fully open position, a fully closed position, or any intermediate position between the fully open and fully closed positions to adjust the pressure of the gas refrigerant. In other embodiments, the measurements obtained by sensor PS11B are provided directly to the EEPR valve and used by the EEPR valve to control the pressure of the gas refrigerant in fluid conduit 117. The EEPR valve can use a feedback control technique (e.g., PID control) to open and close the EEPR valve to control the pressure of the gas refrigerant.

Refrigeration system 100 may include a subcooled liquid temperature sensor TS12 configured to measure the temperature of the subcooled liquid refrigerant exiting first side 116 of subcooler 106. In some embodiments, the measurements obtained by subcooled liquid temperature sensor TL12 are provided as an input to controller 114. Controller 114 can use the measurements obtained by sensor TL12 to control the position of an electronic expansion valve (EEV) positioned along connecting line 107 (e.g., at the inlet of second side 118 of receiver 106). Controller 114 can variably open and close the EEV to regulate the amount of subcooling applied to the liquid refrigerant within subcooler 106. Controller 114 can set the position of the EEV to a fully open position, a fully closed position, or any intermediate position between the fully open and fully closed positions to adjust the amount of subcooling.

In some embodiments, adjusting the EEV toward the fully closed position decreases the amount of subcooling (i.e., increases the temperature of the subcooled refrigerant), whereas adjusting the EEV toward the fully open position increases the amount of subcooling (i.e., decreases the temperature of the subcooled refrigerant). Accordingly, controller 114 can variably close the EEV (i.e., move the EEV toward the fully closed position) to decrease the subcooling provided by subcooler 106 in response to a determination that the measured temperature of the subcooled refrigerant is less than a setpoint or target value. Similarly, controller 114 can variably open the EEV (i.e., move the EEV toward a fully open position) to increase the amount of subcooling provided by subcooler 106 in response to a determination that the measured temperature of the subcooled refrigerant is greater than a setpoint or target value. In this way, controller 114 can control the EEV to achieve a setpoint or target value for the temperature of the subcooled liquid refrigerant exiting subcooler 106.

Refrigeration system 100 may include a liquid pressure sensor PL2 and a liquid temperature sensor TL10 configured to measure the pressure and temperature of the liquid refrigerant in fluid conduit 109. In some embodiments, the measurements obtained by sensors PL2 and TL10 are provided as an input to controller 114. Controller 114 can use the measurements obtained by sensors PL2 and TL10 to control the position of the electronic pressure regulator valve ELPR positioned along fluid conduit 109. The ELPR valve can be operated by controller 114 to regulate the pressure of the liquid refrigerant in subcooler 106 and/or in fluid conduit 109.

Refrigeration system 100 may include a suction line pressure sensor PS1 and a suction line temperature sensor TS1 configured to measure the pressure and temperature of the gas refrigerant in suction line 111. In some embodiments, the measurements obtained by sensors PS1 and TS1 are provided as an input to controller 114. Controller 114 can use the measurements obtained by sensors PS1 and TS1 to control compressors 112 and/or the positions of expansion devices 108. Compressors 112 can be operated by controller 114 to regulate the pressure of the gas refrigerant in suction line 111.

Refrigeration system 100 may include a discharge line pressure sensor PD1 and a discharge line temperature sensor TD1 configured to measure the pressure and temperature of the compressed gas refrigerant in discharge line 113. In some embodiments, the measurements obtained by sensors PD1 and TD1 are provided as an input to controller 114. Controller 114 can use the measurements obtained by sensors PD1 and TD1 to control compressors 112. Compressors 112 can be operated by controller 114 to regulate the pressure and/or temperature of the compressed gas refrigerant in discharge line 113.

Refrigeration System with Combined Superheat and Subcooling Control

Figure 2:
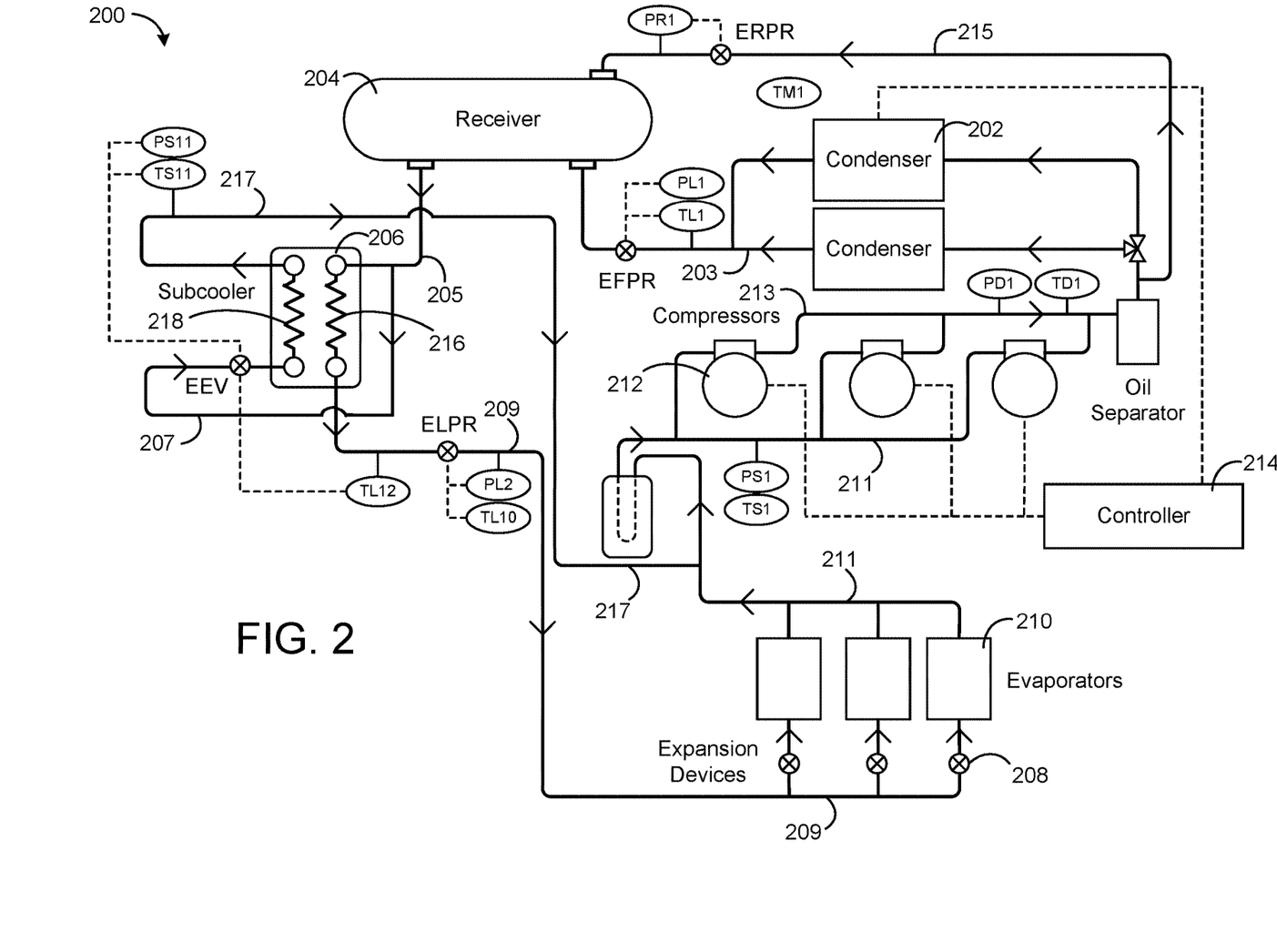
FIG. 2 is diagram of a refrigeration system with combined superheat and subcooling control, according to an exemplary embodiment.

Referring now to FIG. 2, another refrigeration system 200 is shown, according to an exemplary embodiment. Refrigeration system 200 may be used in conjunction with a temperature-controlled display device (e.g., a refrigerated merchandiser) or other refrigeration device used to store and/or display refrigerated or frozen objects in a commercial, institutional, or residential setting. Refrigeration system 200 may include many of the same components as refrigeration system 100. For example, refrigeration system 200 is shown to include condensers 202, a receiver 204, a subcooler 206, expansion devices 208, evaporators 210, compressors 212, a controller 214, and a variety of sensors and control valves. In some embodiments, refrigeration system 200 operates using a vapor-compression refrigeration cycle in which a refrigerant is circulated between condensers 202 and evaporators 210 to provide cooling for evaporators 210.

Condensers 202 may be heat exchangers or other similar devices for removing heat from a refrigerant that circulates between evaporators 210 and condensers 202. In some embodiments, condensers 202 include multiple condensers arranged in parallel with each other. Condensers 202 may receive vapor refrigerant from compressors 212 and may partially or fully condense the vapor refrigerant by removing heat from the refrigerant. The condensation process may result in a liquid refrigerant or a liquid-vapor mixture. In other embodiments, condensers 202 cool the refrigerant vapor (e.g., by removing superheat) without condensing the refrigerant vapor. In some embodiments, the cooling/condensation process is an isobaric process. Condensers 202 may provide the cooled and/or condensed refrigerant to receiver 204 via fluid conduit 203.

Receiver 204 may collect liquid refrigerant from fluid conduit 203 and may receive gas refrigerant via fluid conduit 215. In some embodiments, receiver 204 is a flash tank or other fluid reservoir. Receiver 204 may include a liquid portion and a vapor portion and may contain a partially saturated mixture of liquid refrigerant and vapor refrigerant. In some embodiments, receiver 204 separates the liquid refrigerant from the vapor refrigerant. The liquid refrigerant may exit receiver 204 through fluid conduit 205, which may deliver the liquid refrigerant to a first side 216 of subcooler 206.

Subcooler 206 can be configured to subcool the liquid refrigerant provided by receiver 204. Subcooler 206 is shown to include a first side 216 and a second side 218. First side 216 may receive the liquid refrigerant from fluid conduit 205. In some embodiments, a connecting line 207 fluidly connects fluid conduit 205 to a second side 218 of subcooler 206. An electronic expansion valve (EEV) may be disposed along connecting line 207 and may be configured to expand the liquid refrigerant to a low temperature gas. The gas refrigerant may flow through second side 218 of subcooler 206 and may absorb heat from the liquid refrigerant in first side 216, thereby providing subcooling for the liquid refrigerant. The subcooled refrigerant exiting first side 216 may be delivered to expansion devices 208 via a fluid conduit 209, whereas the gas refrigerant exiting second side 218 may be delivered to fluid conduit 211 (downstream of evaporators 210) via a fluid conduit 217.

Expansion devices 208 may be electronic expansion valves or another similar expansion devices. In various embodiments, expansion devices 208 may be controlled by controller 214 (e.g., using an automatic control scheme), manually by a user, or may be set to a predetermined position. In some embodiments, expansion devices 208 include multiple expansion devices arranged in parallel with each other. Expansion devices 208 may cause the subcooled refrigerant to undergo a rapid drop in pressure, thereby expanding the subcooled refrigerant to a lower pressure, lower temperature state. The expanded refrigerant is then provided to evaporators 210.

Evaporators 210 may receive the cooled and expanded refrigerant from expansion devices 208. In some embodiments, evaporators 210 include multiple evaporators arranged in parallel with each other. In some embodiments, evaporators 210 are associated with display cases/devices (e.g., if refrigeration system 200 is implemented in a supermarket setting). Evaporators 210 may be configured to facilitate the transfer of heat from the display cases/devices into the refrigerant. The added heat may cause the refrigerant to evaporate partially or completely. In some embodiments, the evaporation process may be an isobaric process. Evaporators 210 may output the refrigerant into a suction line 211 which delivers the refrigerant to compressors 212.

Compressors 212 may compress the refrigerant to a high temperature, high pressure gas. In some embodiments, compressors 212 include multiple compressors arranged in parallel with each other. Compressors 212 can discharge the high temperature, high pressure refrigerant into a discharge line 213 which fluidly connects compressors 212 to condensers 202. In some embodiments, a fluid conduit 215 fluidly connects discharge line 213 to a gas inlet of receiver 204. Compressors 212 may be controlled by controller 214, or by any suitable controller and control scheme.

Refrigeration system 200 is shown to include a variety of sensors and control valves. For example, refrigeration system 200 may include a liquid pressure sensor PL1 and a liquid temperature sensor TL1 configured to measure the pressure and temperature of the liquid refrigerant in fluid conduit 203. In some embodiments, the measurements obtained by sensors PL1 and TL1 are provided as an input to controller 214. Controller 214 can use the measurements obtained by sensors PL1 and TL1 to control the position of the electronic pressure regulator valve EFPR positioned along fluid conduit 203. The EFPR valve can be operated by controller 214 to regulate the pressure of the refrigerant in receiver 204.

Refrigeration system 200 may include a receiver pressure sensor PR1 configured to measure the pressure of the refrigerant in fluid conduit 215 and/or within receiver 204. In some embodiments, the measurements obtained by pressure sensor PR1 are provided as an input to controller 214. Controller 214 can use the measurements obtained by pressure sensor PR1 to control the position of the electronic pressure regulator valve ERPR positioned along fluid conduit 215. The ERPR valve can be operated by controller 214 to regulate the pressure of the refrigerant gas in receiver 204.

Refrigeration system 200 may include an ambient temperature sensor TM1 configured to measure the ambient temperature outside condensers 202. In some embodiments, the measurements obtained by temperature sensor TM1 are provided as an input to controller 214. Controller 214 can use the measurements obtained by temperature sensor TM1 determine a temperature differential between the refrigerant in condensers 202 and the ambient temperature. This temperature differential may have an impact on the rate of heat transfer provided by condensers 202 and can be used by controller 214 to determine the operating efficiency of condensers 202.

Refrigeration system 200 may include a gas pressure sensor PS11 and a gas temperature sensor TS11 configured to measure the pressure and temperature of the gas refrigerant exiting second side 218 of subcooler 206 (i.e., the gas refrigerant in fluid conduit 217). Alternatively, sensors PS11 and TS11 can be positioned to measure the pressure and temperature of the refrigerant gas within second side 218 of subcooler 206. In some embodiments, the measurements obtained by sensors PS11 and TS11 are provided as an input to controller 214. Controller 214 can use the measurements obtained by sensors PS11 and TS11 to calculate an amount of superheat of the gas refrigerant in fluid conduit 217. In some embodiments, controller 214 uses the calculated amount of superheat to control the position of an electronic expansion valve (EEV) positioned along connecting line 207. For example, controller 214 can be configured to close the EEV in response to a determination that the calculated amount of superheat is less than a threshold value.

Refrigeration system 200 may include a subcooled liquid temperature sensor TS12 configured to measure the temperature of the subcooled liquid refrigerant exiting first side 216 of subcooler 206. In some embodiments, the measurements obtained by subcooled liquid temperature sensor TL12 are provided as an input to controller 214. Controller 214 can use the measurements obtained by sensor TL12 to control the position of the EEV positioned along connecting line 207 (e.g., at the inlet of second side 218 of receiver 206). Controller 214 can variably open and close the EEV to regulate the amount of subcooling applied to the liquid refrigerant within subcooler 206. Controller 214 can set the position of the EEV to a fully open position, a fully closed position, or any intermediate position between the fully open and fully closed positions to adjust the amount of subcooling.

In some embodiments, adjusting the EEV toward the fully closed position decreases the amount of subcooling (i.e., increases the temperature of the subcooled refrigerant), whereas adjusting the EEV toward the fully open position increases the amount of subcooling (i.e., decreases the temperature of the subcooled refrigerant). Accordingly, controller 214 can variably close the EEV (i.e., move the EEV toward the fully closed position) to decrease the subcooling provided by subcooler 206 in response to a determination that the measured temperature of the subcooled refrigerant is less than a setpoint or target value. Similarly, controller 214 can variably open the EEV (i.e., move the EEV toward a fully open position) to increase the amount of subcooling provided by subcooler 206 in response to a determination that the measured temperature of the subcooled refrigerant is greater than a setpoint or target value. In this way, controller 214 can control the EEV to achieve a setpoint or target value for the temperature of the subcooled liquid refrigerant exiting subcooler 206.

In some embodiments, controller 214 operates the EEV to control both the temperature of the subcooled liquid in fluid conduit 209 and the amount of superheat of the gas refrigerant in fluid conduit 217. For example, controller 214 can operate the EEV using a feedback control technique (e.g., PID control) to regulate the temperature of the subcooled liquid subject to a requirement that the amount of superheat of the gas refrigerant be maintained at or above a predetermined superheat threshold. If the calculated amount of superheat is less than the superheat threshold, controller 214 may close the EEV regardless of the temperature of the subcooled liquid. However, if the calculated amount of superheat is equal to or greater than the superheat threshold, controller 214 can operate the EEV using a feedback control technique to achieve a target or setpoint value for the temperature of the subcooled liquid. The operations technique performed by controller 214 to control the EEV are described in greater detail with reference to FIGS. 3-4.

Refrigeration system 200 may include a liquid pressure sensor PL2 and a liquid temperature sensor TL10 configured to measure the pressure and temperature of the liquid refrigerant in fluid conduit 209. In some embodiments, the measurements obtained by sensors PL2 and TL10 are provided as an input to controller 214. Controller 214 can use the measurements obtained by sensors PL2 and TL10 to control the position of the electronic pressure regulator valve ELPR positioned along fluid conduit 209. The ELPR valve can be operated by controller 214 to regulate the pressure of the liquid refrigerant in subcooler 206 and/or in fluid conduit 209.

Refrigeration system 200 may include a suction line pressure sensor PS1 and a suction line temperature sensor TS1 configured to measure the pressure and temperature of the gas refrigerant in suction line 211. In some embodiments, the measurements obtained by sensors PS1 and TS1 are provided as an input to controller 214. Controller 214 can use the measurements obtained by sensors PS1 and TS1 to control compressors 212 and/or the positions of expansion devices 208. Compressors 212 can be operated by controller 214 to regulate the pressure of the gas refrigerant in suction line 211.

Refrigeration system 200 may include a discharge line pressure sensor PD1 and a discharge line temperature sensor TD1 configured to measure the pressure and temperature of the compressed gas refrigerant in discharge line 213. In some embodiments, the measurements obtained by sensors PD1 and TD1 are provided as an input to controller 214. Controller 214 can use the measurements obtained by sensors PD1 and TD1 to control compressors 212. Compressors 212 can be operated by controller 214 to regulate the pressure and/or temperature of the compressed gas refrigerant in discharge line 213.

Expansion Valve Control

Figure 3:
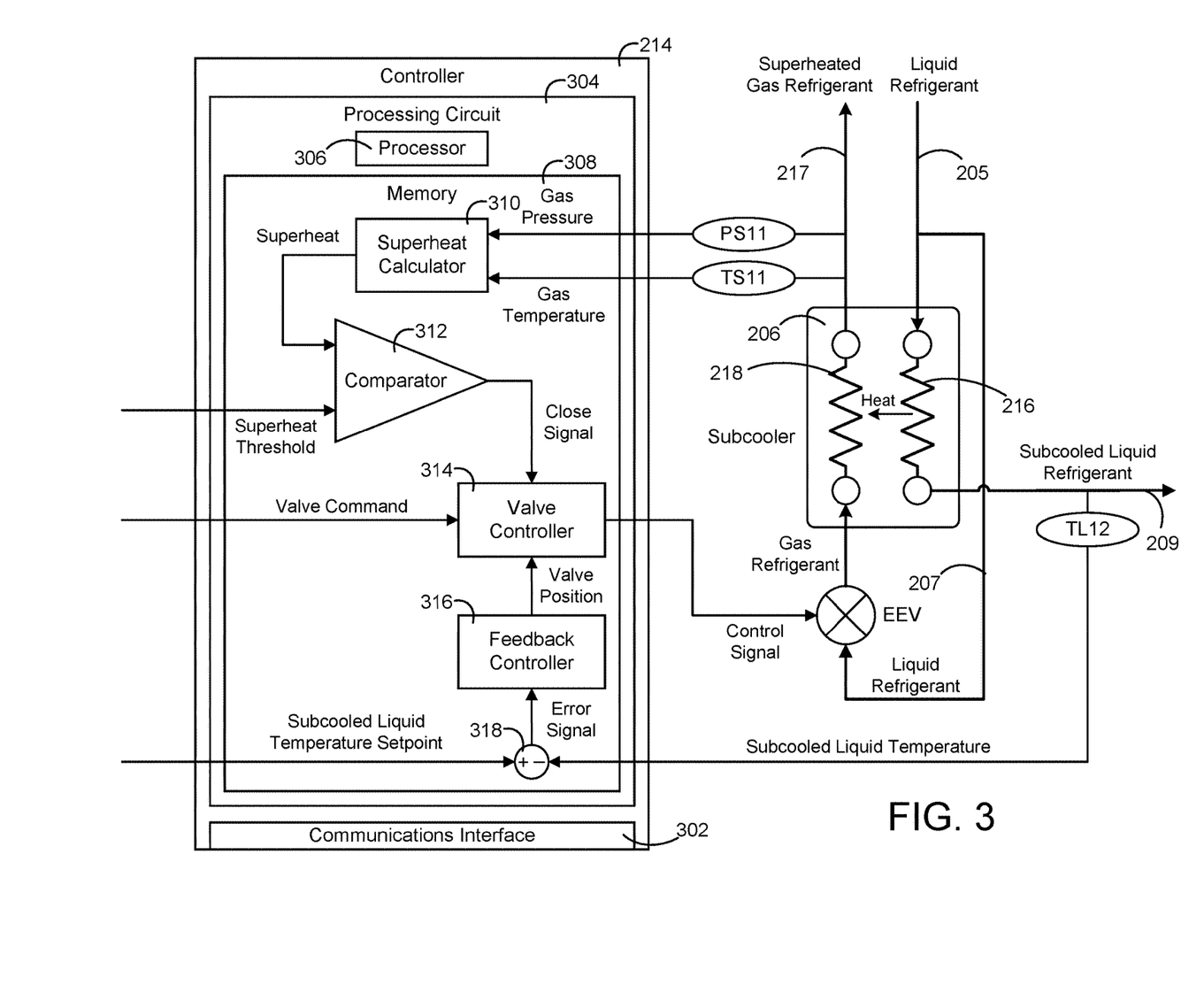
FIG. 3 is block diagram illustrating the controller of FIG. 2 in greater detail, according to an exemplary embodiment.

Referring now to FIG. 3, a block diagram illustrating some components of controller 214 in greater detail is shown, according to an exemplary embodiment. Controller 214 is shown to include a communications interface 302 and a processing circuit 304. Communications interface 302 may include wired or wireless interfaces (e.g., jacks, antennas, transmitters, receivers, transceivers, wire terminals, etc.) for conducting data communications with various systems, devices, or networks. For example, communications interface 302 may include an Ethernet card and port for sending and receiving data via an Ethernet-based communications network. In another example, communications interface 302 may include a WiFi transceiver for communicating via a wireless communications network. Communications interface 302 may be configured to communicate via local area networks or wide area networks (e.g., the Internet, a building WAN, etc.) and may use a variety of communications protocols (e.g., TCP/IP, point-to-point, etc.). In some embodiments, controller 214 uses communications interface 302 to receive input from various sensors and send control signals to various operable components of refrigeration system 200.

Processing circuit 304 is shown to include a processor 306 and memory 308. Processor 306 may be a general purpose or specific purpose processor, an application specific integrated circuit (ASIC), one or more field programmable gate arrays (FPGAs), a group of processing components, or other suitable processing components. Processor 306 may be configured to execute computer code or instructions stored in memory or received from other computer readable media (e.g., CDROM, network storage, a remote server, etc.).

Memory 308 may include one or more devices (e.g., memory units, memory devices, storage devices, etc.) for storing data and/or computer code for completing and/or facilitating the various processes described in the present disclosure. Memory 308 may include random access memory (RAM), read-only memory (ROM), hard drive storage, temporary storage, non-volatile memory, flash memory, optical memory, or any other suitable memory for storing software objects and/or computer instructions. Memory 308 may include database components, object code components, script components, or any other type of information structure for supporting the various activities and information structures described in the present disclosure. Memory 308 may be communicably connected to processor 306 via processing circuit 304 and may include computer code for executing one or more processes described herein.

Still referring to FIG. 3, controller 214 is shown to include a superheat calculator 310. Superheat calculator 310 can be configured to calculate an amount of superheat of the gas refrigerant exiting subcooler 206 (i.e., the gas refrigerant in fluid conduit 217) and/or the gas refrigerant within second side 218 of subcooler 206. Superheat calculator 310 may receive measurements of the pressure and temperature of the gas refrigerant in fluid conduit 217 from pressure sensor PS11 and temperature sensor TS11. Sensors PS11 and TS11 can be positioned to measure the pressure and temperature of the gas refrigerant within second side 218 of subcooler 206 or at the outlet of subcooler 206 (e.g., within fluid conduit 217). Superheat calculator 310 can use the measured pressure as an input to a function or lookup table to determine the boiling point of the refrigerant at the measured pressure. Superheat calculator 310 can subtract the boiling point of the refrigerant from the measured temperature to calculate the amount of superheat.

Controller 214 is shown to include a comparator 312 and a valve controller 314. Comparator 312 may receive the calculated superheat from superheat calculator 310 and may compare the calculated superheat to a superheat threshold. If the calculated superheat is less than the superheat threshold, comparator 312 may provide a signal to valve controller 314 to close the EEV (i.e., a "close signal"). In some embodiments, the close signal operates as an override signal which causes valve controller 314 to close the EEV regardless of other inputs to valve controller 314. Closing the EEV may include completely closing the EEV to completely stop the flow of refrigerant gas through second side 218 of subcooler 206 or partially closing the EEV to reduce the flow of refrigerant gas through second side 218 of subcooler 206. However, if the calculated superheat is equal to or greater than the superheat threshold, comparator 312 may not provide the close signal to valve controller 314. In the absence of the close signal, valve controller 314 may operate the EEV in accordance with a valve position signal received from feedback controller 316 and/or a valve command signal received from an external data source (e.g., a manual override).

Controller 214 is shown to include a feedback controller 316 and a subtraction element 318. Subtraction element 318 may receive measurements of the subcooled liquid refrigerant temperature from the temperature sensor TL12 located at the subcooled liquid outlet of subcooler 206 (i.e., along fluid conduit 209). Subtraction element 318 may subtract the measured subcooled liquid temperature from a subcooled liquid temperature setpoint to calculate an error signal. Feedback controller 316 can be configured to control the position of the EEV using a feedback control technique. For example, feedback controller 316 may receive the error signal from subtraction element 318 and may generate the valve position signal that drives the error signal to zero. In various embodiments, feedback controller 316 may operate as a proportional-integral (PI) controller, a proportional-integral-derivative (PID) controller, a pattern recognition adaptive controller (PRAC), a model recognition adaptive controller (MRAC), a model predictive controller (MPC), or any other type of feedback controller using any type of feedback control technique. In some embodiments, feedback controller 316 provides the valve position signal to valve controller 314.

Valve controller 314 may be configured to provide a control signal to the EEV. The control signal may cause the EEV to open, close, or move to an intermediate position. In some embodiments, valve controller 314 uses a combination of inputs from comparator 312 and feedback controller 316 to determine the value of the control signal 316. For example, if comparator 312 is providing the close signal, valve controller 314 may provide a control signal that causes the EEV to close regardless of the value of the valve position signal from feedback controller 316. However, if comparator 312 is not providing the close signal, valve controller 314 may use the valve position signal from feedback controller 316 to generate the control signal for the EEV. In some embodiments, valve controller 314 passes the valve position signal from feedback controller 316 to the EEV in the absence of the close signal from comparator 312, thereby allowing feedback controller 316 to control the position of the EEV.

Expansion Valve Control Process

Figure 4:
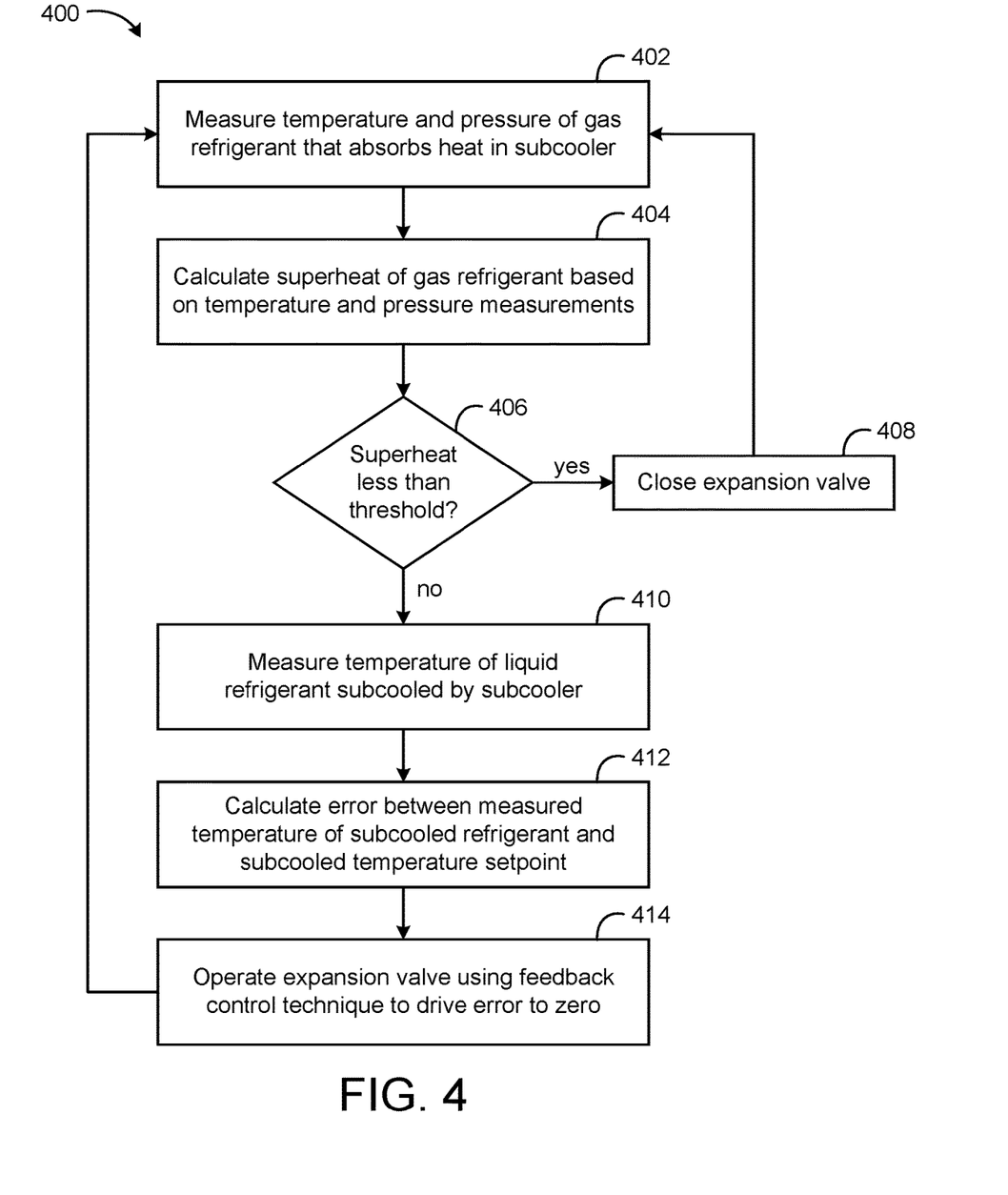
FIG. 4 is a flowchart of a process for controlling an expansion valve to provide combined superheat and subcooling control, according to an exemplary embodiment.

Referring now to FIG. 4, a flowchart of a process 400 for controlling an electronic expansion valve in a refrigeration system is shown, according to an exemplary embodiment. In some embodiments, process 400 is performed by one or more components of refrigeration system 200, as described with reference to FIGS. 2-3. For example, process 400 can be performed by controller 214 using input from various sensors.

Process 400 is shown to include measuring temperature and pressure of a gas refrigerant that absorbs heat in a subcooler (step 402). The subcooler (e.g., subcooler 206) may include a first side (e.g., side 216) through which a liquid refrigerant flows and a second side (e.g., side 218) through which a gas refrigerant flows. The subcooler can be configured to transfer heat from the first side to the second side to provide subcooling for the liquid refrigerant. Accordingly, the gas refrigerant in the second side may absorb heat from the liquid refrigerant in the first side (as shown in FIG. 3) to provide subcooling for the liquid refrigerant in the first side. In some embodiments, the temperature and pressure are measured by sensors TS11 and PS11. The sensors TS11 and PS11 can be positioned at an outlet of the subcooler and configured to measure the temperature and pressure of the superheated refrigerant gas at the outlet of the subcooler. Alternatively, the sensors TS11 and PS11 can be positioned within the second side of the subcooler and configured to measure the temperature and pressure of the refrigerant gas within the second side of the subcooler.

Process 400 is shown to include calculating the superheat of the gas refrigerant based on the temperature and pressure measurements (step 404). In some embodiments, step 402 includes using the measured pressure as an input to a function or lookup table to determine the boiling point of the refrigerant at the measured pressure. The boiling point of the refrigerant at the measured pressure can be subtracted from the measured temperature to calculate the amount of superheat. In other words, the amount of superheat can be defined as the amount by which the temperature of the refrigerant exceeds the boiling point of the refrigerant at the measured pressure.

Process 400 is shown to include determining whether the calculated superheat is less than a superheat threshold (step 406). If the calculated superheat is less than the superheat threshold (i.e., the result of step 406 is "yes"), process 400 may proceed to step 408. Step 408 may include closing an expansion valve (e.g., the EEV shown in FIGS. 2-3). In some embodiments, the expansion valve is located at the inlet of the second side of the subcooler. The expansion valve can be configured to expand the liquid refrigerant to a low temperature, low pressure gas and provide the refrigerant gas to the second side of the subcooler. The refrigerant can then flow through the second side of the subcooler and may absorb heat from the liquid refrigerant flowing through the first side of the subcooler to provide subcooling for the liquid refrigerant. In various embodiments, step 408 may involve completely closing the expansion valve to completely stop the flow of refrigerant gas through the second side of the subcooler or partially closing the expansion valve to reduce the flow of refrigerant gas through the second side of the subcooler.

If the calculated superheat is equal to or greater than the superheat threshold (i.e., the result of step 406 is "no"), process 400 may proceed to step 410. Step 410 may include measuring the temperature of the liquid refrigerant subcooled by the subcooler. In some embodiments, the temperature of the subcooled refrigerant is measured by temperature sensor TL12. Temperature sensor TL12 can be positioned at the outlet of the first side of the subcooler (e.g., along fluid conduit 209) and configured to measure the temperature of the subcooled liquid refrigerant at the outlet of the subcooler. Alternatively, temperature sensor TL12 can be positioned within the first side of the subcooler and configured to measure the temperature of the liquid refrigerant within the first side of the subcooler.

Process 400 is shown to include calculating an error between the measured temperature of the subcooled refrigerant and a subcooled temperature setpoint (step 412) and operating the expansion valve using a feedback control technique to drive the error to zero (step 414). Step 412 may include subtracting the measured temperature of the subcooled refrigerant from the subcooled temperature setpoint to calculate the error. In some embodiments, step 414 includes generating a control signal for the expansion valve. The control signal can be generated using a proportional-integral (PI) control technique, a proportional-integral-derivative (PID) control technique, a pattern recognition adaptive control (PRAC) technique, a model recognition adaptive control (MRAC) technique, a model predictive control (MPC) technique, or any other type of feedback control technique. The control signal can be provided to the expansion valve, which may cause the expansion valve to move to a valve position specified by the control signal.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Elements shown as integrally formed may be constructed of multiple parts or elements. The elements and assemblies may be constructed from any of a wide variety of materials that provide sufficient strength or durability, in any of a wide variety of colors, textures, and combinations. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Any means-plus-function clause is intended to cover the structures described herein as performing the recited function and not only structural equivalents but also equivalent structures. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A refrigeration system comprising:
a subcooler configured to provide subcooling for a liquid refrigerant flowing through a first side of the subcooler by transferring heat from the liquid refrigerant to a gas refrigerant flowing through a second side of the subcooler;
a single expansion valve located at an inlet of the second side of the subcooler and configured to control a flow of the gas refrigerant through the second side of the subcooler;
a gas temperature sensor configured to measure a temperature of the gas refrigerant;
a gas pressure sensor configured to measure a pressure of the gas refrigerant;
a liquid temperature sensor configured to measure a temperature of the subcooled liquid refrigerant; and
a controller configured to perform operations comprising:
calculating a superheat of the gas refrigerant based on the measured temperature and measured pressure of the gas refrigerant;
comparing the calculated superheat to a superheat threshold;
in response to a determination that the calculated superheat is less than the superheat threshold, closing the single expansion valve to increase the superheat of the gas refrigerant to at or above the superheat threshold; and
in response to a determination that the calculated superheat is equal to or greater than the superheat threshold, operating the single expansion valve to regulate the temperature of the subcooled liquid refrigerant to a subcooled liquid temperature setpoint while maintaining the superheat of the gas refrigerant at or above the superheat threshold.

2. The refrigeration system of claim 1, further comprising a fluid conduit coupled to an outlet of the second side of the subcooler and configured to receive the gas refrigerant exiting the subcooler; and
wherein the gas temperature sensor and the gas pressure sensor are located along the fluid conduit and configured to measure the temperature and pressure of the gas refrigerant, respectively, within the fluid conduit.

3. The refrigeration system of claim 1, further comprising:
a liquid refrigerant line coupled to an inlet of the first side of the subcooler and configured to deliver a first portion of the liquid refrigerant to the first side of the subcooler; and
a connecting line coupled to the liquid refrigerant line and to the single expansion valve and configured to deliver a second portion of the liquid refrigerant to the single expansion valve.

4. The refrigeration system of claim 1, wherein the controller comprises:
a valve controller configured to operate the single expansion valve;
a feedback controller configured to generate a valve position signal and provide the valve position signal to the valve controller; and
a comparator configured to compare the calculated superheat to the superheat threshold and provide a valve close signal to the valve controller in response to a determination that the calculated superheat is less than the superheat threshold.

5. The refrigeration system of claim 4, wherein the valve controller is configured to perform operations comprising:
operating the single expansion valve using the valve position signal when the close signal is not provided by the comparator; and
overriding the valve position signal with the close signal when the close signal is provided by the comparator, the close signal causing the single expansion valve to close.

6. The refrigeration system of claim 4, wherein the feedback controller is configured to perform operations further comprising generating the valve position signal based on a difference between the temperature of the subcooled liquid refrigerant and the subcooled liquid temperature setpoint.

7. The refrigeration system of claim 1, wherein the operation of closing the single expansion valve to raise the measured temperature and measured pressure of the gas refrigerant to at or above the superheat threshold closing the expansion valve comprises:
completely closing the single expansion valve to completely stop a flow of the gas refrigerant through the subcooler; or
partially closing the single expansion valve to reduce the flow of the gas refrigerant through the subcooler.

8. The refrigeration system of claim 1, further comprising a temperature controlled display device coupled to the subcooler, the temperature controlled display device configured to store and display a cooled object.

9. The refrigeration system of claim 8, further comprising:
an expansion device fluidly coupled to an outlet of the first side of the subcooler to receive the subcooled liquid refrigerant from the subcooler, the expansion device expanding the subcooled refrigerant to a lower pressure and a lower temperature;
an evaporator fluidly connected to an outlet of the expansion device to receive the expanded subcooled refrigerant at the lower pressure and lower temperature, the evaporator configured to receive heat from the temperature controlled display device and transfer the heat to the expanded subcooled refrigerant;
a compressor fluidly coupled to an outlet of the evaporator to receive the heated refrigerant and increase a pressure of the heated refrigerant to form a pressurized heated refrigerant; and
a condenser fluidly coupled to an outlet of the compressor to receive the pressurized heated refrigerant, the condenser configured to remove heat from a pressurized heated refrigerant to form the liquid refrigerant, the condenser configured to transfer the liquid refrigerant to the subcooler.

10. The refrigeration system of claim 4, wherein the operation of calculating a superheat of the gas refrigerant based on the measured temperature and measured pressure of the gas refrigerant comprises:
receiving a value of the temperature of the gas refrigerant from the gas temperature sensor;
receiving a value of the pressure of the gas refrigerant from the gas pressure sensor;
determining a boiling point of the gas refrigerant at the value of the pressure the gas refrigerant; and
calculating an amount of superheat by subtracting the boiling point of the refrigerant from the value of the temperature of the gas refrigerant.

11. The refrigeration system of claim 10, wherein the operation of determining the boiling point of the gas refrigerant comprises inputting the value of the pressure of the gas refrigerant into a function or a lookup table.

12. The refrigeration system of claim 4, wherein the feedback controller comprises at least one of a proportional-integral controller, a proportional-integral-derivative controller, a pattern recognition adaptive controller, a model recognition adaptive controller, or a model predictive controller.

13. The refrigeration system of claim 4, further comprising a subcooled liquid temperature sensor configured to measure a temperature of the subcooled liquid refrigerant at an outlet of the first side of the subcooler.

14. The refrigeration system of claim 13, wherein the controller further comprises a subtraction element.

15. The refrigeration system of claim 14, wherein the controller is configured to perform operations further comprising:
   receiving a value of the temperature of the subcooled liquid refrigerant from the subcooled liquid temperature sensor;
   calculating an error signal from the value of the temperature of the subcooled liquid refrigerant; and
   transmit the error signal to the feedback controller.

16. The refrigeration system of claim 15, wherein the operation of calculating an error signal from the value of the temperature of the subcooled liquid refrigerant comprises subtracting the value of the temperature of the subcooled liquid refrigerant from the subcooled liquid temperature setpoint.

17. The refrigeration system of claim 16, wherein the operation of generating the valve position signal and providing the valve position signal to the valve controller by the feedback controller comprise:
   receiving the error signal from subtraction element; and
   generating the valve position signal that drives the error signal to zero.

18. The refrigeration system of claim 4, wherein the controller is configured to perform operations further comprising, when the comparator is not providing the close signal, generating the control signal for the single expansion valve by the valve controller using the valve position signal from feedback controller.

19. The refrigeration system of claim 4, wherein the controller is configured to perform operations further comprising, when the valve controller passes the valve position signal from feedback controller to the single expansion valve in the absence of the close signal from comparator, controlling the position of the single expansion valve by the feedback controller.

20. The refrigeration system of claim 4, wherein the controller is configured to perform further operations comprising, in the absence of the close signal from the comparator, valve controller is configured to operate the single expansion valve with the valve position signal received from feedback controller or a valve command signal received from a manual override.

* * * * *